June 30, 1970   D. P. WEAVER   3,517,999
OPTICAL STRAIN GAUGE
Filed Jan. 7, 1966

INVENTOR.
DAVID P. WEAVER
BY
ATTORNEY

United States Patent Office 3,517,999
Patented June 30, 1970

3,517,999
OPTICAL STRAIN GAUGE
David P. Weaver, Mission Hills, Calif., assignor to International Telephone and Telegraph Corporation, a corporation of Delaware
Filed Jan. 7, 1966, Ser. No. 519,225
Int. Cl. G01b 11/18; A61b 5/08
U.S. Cl. 356—32                                    4 Claims

ABSTRACT OF THE DISCLOSURE

The invention relates to an optical strain gauge comprising a flexible body which is deformable according to the sense of an external force. A source of light and a photocell in spaced relationship to the source of light are embedded in the body. The photocell is responsive to light transmission through the material of the body and produces a signal according to the deformation produced in the body by the external force.

---

This invention relates generally to an optical strain gauge, and more particularly to an optical strain gauge with a light bulb-photoelectric cell arrangement.

There are many devices employing a light bulb-photoelectric cell arrangement, some with special application to biomedical electronics and some applicable to mechanical measurements. In general, these devices are specifically adapted to be used in one application or another, and not equally suited for either task. In biomedical electronics for instance, fixed and rigid light bulb-photoelectric cell arrangements are used for counting pulse rate in the vascular system, this rigid placement of the photo cell and light bulb works by transillumination of a body part, i.e., projected through the ear lobe or finger to impinge upon the photocell, or light reflected from the skin surface onto the photocell. These are referred to as transilluminated densitometer and reflectance densitometer, respectively. Still other devices employ flexible membranes on one portion of the device to sense blood pressure flow under the membrane. This invention however is not the same genetically although at first glance it might appear so.

The device of my invention is precisely called an optical strain gauge, for the light bulb and photocell relationship is not rigid or fixed, and the primary function is one of a strain gauge. These components are encapsulated in an elastic media and made insensitive to all external illuminations and variations and in external illumination. The mean pathway between the light bulb and the photocell is a strain element made of an elastic substance. Therefore, any force or combination of forces acting on this device produces a signal or combination of signals due to variations in the mean path. This device will sense longitudinal deformations of stretch or compression, lateral deformations of stretch or compression, and torsion. It is evident therefore, that the device of this invention does not have the inherent limitations possessed by similar devices employing light bulb-photoelectric cell arrangements, wherein the arrangement is fixed and rigid, or only a portion of the arrangement is adapted to deform.

Accordingly, an object of this invention is to provide an optical strain gauge which can be used for sensing and for measuring transient or varying phenomena, such as pulse rate, respiration or muscle contractions.

Another object of this invention is to provide an optical strain gauge which can be used for all mechanical steady state sensing, such as air pressure or gas pressure or for sensing small mechanical variations as, for example, a phonograph reproduction cartridge when attached to a suitable tone arm and needle.

A further object of this invention is to provide an optical strain gauge which can be economically manufactured though relatively small in size.

One example of use of this optical strain gauge is its use to measure the respiration of a patient, by suitable attachment to the patients chest or abdomen. The light bulb and photocell are encapsulated in a flexible body and are made insensitive to all external illumination, thus making the photocell responsive only to the light from the bulb. Expansion or contraction of the assembly due to the patients respiration, causes light from the light bulb to reach the photocell in varying amounts due to variation in the mean path caused by deformations of the flexible body. The output of the photocell can then be connected to a suitable electronic circuit with an indicating device calibrated directly in breaths per minute.

The above mentioned and other features and objects of this invention will become more apparent by reference to the following description taken in conjunction with the accompanying drawings, in which:

FIG. 1 shows a perspective view of a flexible body 1 of any suitable shape which may be mounted to a patient's chest or arm, or to any other element the strain of which is to be measured, by any suitable attaching method, such as the mounting tape shown in phantom lines.

Figure 1:
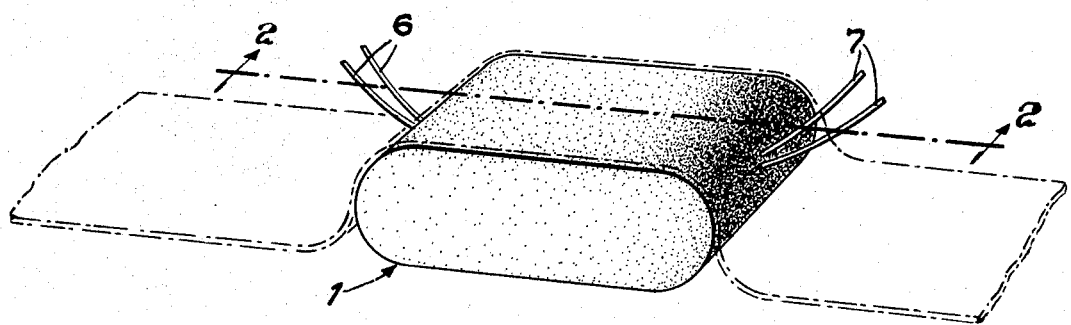
FIG. 1 is a perspective view of the device of the present invention.
Figure 2:
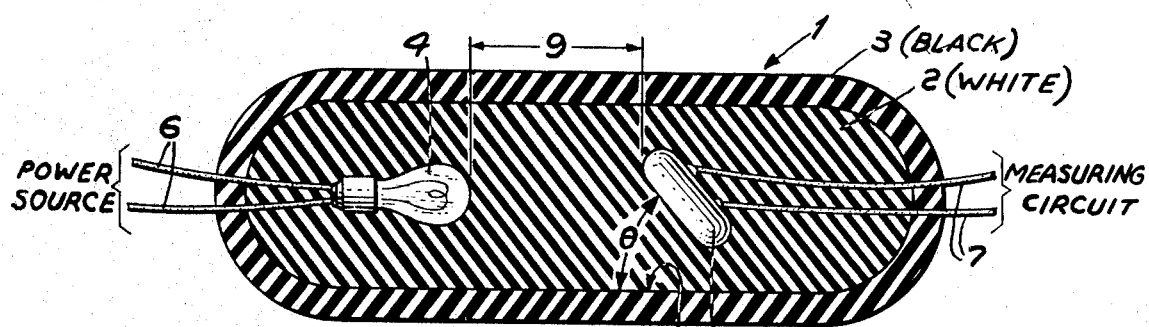
FIG. 2 is a sectional view taken along lines 2—2 of FIG. 1.

Referring to FIG. 2, body 1 is composed of a translucent and flexible substance 2, surrounded by a flexible opaque substance 3.

Encapsulated in substance 2 is a light bulb 4 and a photoelectric cell 5. Leads 6 protrude from body 1 to connect light bulb 4 to a power source, and leads 7 connect the photocell 5 to a suitable measuring circuit. It is well known that if a measuring circuit is coupled to a common power source or command ground then only three leads need be brought out from the body because a common junction may be made by one lead from the photocell and one lead from the bulb.

In a preferred embodiment of this invention, photocell 5 is encapsulated at an angle $\theta$ of approximately 45° with the surface 8, so that deformation of the body will change angle $\theta$ and effect the amount of received light, thus varying the output of the photoelectric cell to the measuring circuit. The translucent and flexible substance 2 is cast in a mold using a white silicon rubber described in Pat. No. 2,843,555, in addition, latex, flexible organic plastics, or other translucent materials may be used. This mold is then cured and results in a white flexible body. This is then recast into a slightly larger mold, using the same silicon rubber, but rendering it opaque to visible and infrared light by adding a black coloring, such as, Ferocolor V–1747 black, lamp black, powdered carbon, or any of the various organic dyes. The resultant exterior 3 suitably cured renders photocell 5 insensitive to all but the illumination from the light bulb 4.

Dimensionally, the body when completed is of the order of 1¾ inches long, 9/16 of an inch high, and ¾ of an inch wide. In a body of this size, the mean distance 9 should be in the order of ½ inch, to provide proper photoelectric cell sensitivity. As the body deforms under an external force, the mean distance 9 will change with angle $\theta$ and effect the output to the measuring circuit.

Figure 3:
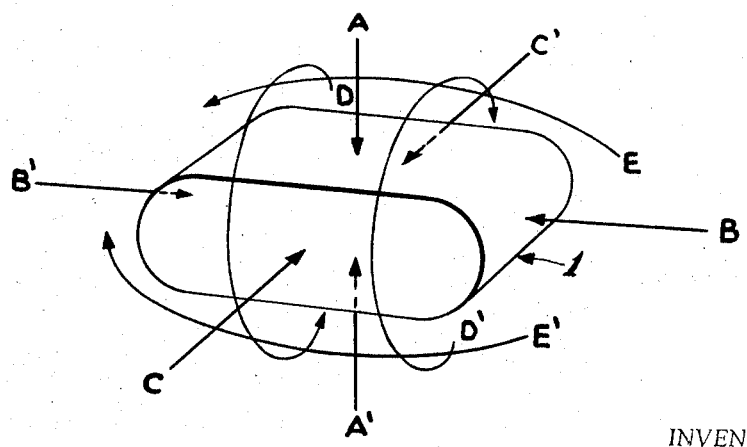
FIG. 3 illustrates the application of forces on the device of FIG. 1.

FIG. 3 shows the application of various forces on body 1, however, the leads have been omitted to simplify the drawing. Forces A, A' may be applied to the body to vary the amount of light received by the photocell, with A' being either a counter force or a stationary force. In the same manner forces B, B' or C, C' will cause the output from the photocell to change, with forces B', C' being a counter force or a stationary force. Torsional forces D, D' or E, E' may be used to produce an output signal, and force D' or E' may be a counter rotary force or a stationary force. The response of this device to torsional forces, make it adaptable to act as a torsion sensor when attached between a driving and driven member or when attached axially along a shaft.

It is well known that either AC or DC may be used to excite the light bulb. If AC is used, this device and its associated circuit functions as a carrier system, which can be used for mechanical steady state sensing, such as air or gas pressure. For sensing transient or varying phenomenon, such as pulse rate or respiration, DC excitation is preferred. The resultant change in current through the photocell is the result of the deformation or strain applied to the body, and yields an analogue signal output proportional to the deforming force. This signal may be amplified by a conventional amplifier. If a differential measurement is desired, two devices may be used with the photocells connected in a bridge or push pull configuration, for use with a differential amplifier to produce a differential signal output.

While I have described above the principles of my invention in connection with specific apparatus it is to be clearly understood that this description is made only by way of example and not as a limitation as to the scope of my invention as set forth in the accompanying claims.

I claim:
1. In an optical strain gauge, the combination of:
   a flexible body being deformable according to the sense of an external force, said flexible body being made of an elastic substance which is deformable to change the configuration of said body;
   a source of light embedded in said body; and
   means also embedded in said body in spaced relation to said source of light which is responsive to light transmission through material of said body to produce a signal according to a deformation produced in said body, the transmission of light through the material of said body being dependent upon the elastic substance and the brightness of the source embedded within the elastic substance; and the exterior of said body being opaque to render said responsive means insensitive to external illumination.

2. An optical strain gauge according to claim 1, wherein said elastic substance is a white silicon rubber, and the exterior of said body is made opaque by coating it with a black substance.

3. An optical strain gauge according to claim 1, in which:
   the source of illumination in said body is a light bulb encapsulated in said elastic substance; and
   said responsive means is a photoelectric cell encapsulated in said elastic substance, said cell being linearly and angularly displaced from said bulb to receive light transmitted through said elastic substance according to the deformations of said body, and said cell being adapted to produce a signal in proportion to the amount of light received.

4. An optical strain gauge according to claim 1, in which:
   said body is composed of a white silicon rubber interior and black silicon rubber exterior, and the rubber of said body being deformable according to the sense of an external force;
   said source of light is a light bulb embedded in said white silicon rubber;
   said responsive means is a photoelectric cell embedded in said white silicon rubber, said cell being linearly and angularly displaced from said bulb to receive light transmitted through said white silicon rubber; and
   said black silicon rubber renders said cell insensitive to external illumination, and the reception of light by said cell being variable according to the amount and sense of an external force applied to said deformable body.

References Cited

UNITED STATES PATENTS

| 3,286,087 | 11/1966 | Sheldon | 356—241 |
| 3,313,205 | 4/1967 | Roberts et al. | |
| 2,313,923 | 3/1943 | Chubb. | |

RONALD L. WIBERT, Primary Examiner

J. ROTHENBERG, Assistant Examiner

U.S. Cl. X.R.

73—88; 128—2.08; 250—215, 224